(12) United States Patent
Tang

(10) Patent No.: US 9,256,741 B2
(45) Date of Patent: Feb. 9, 2016

(54) METHOD AND DEVICE FOR DETERMINING PROPAGATION RELATIONSHIP OF TROJAN HORSE FILES

(71) Applicant: Tencent Technology (Shenzhen) Company Limited, Shenzhen, Guangdong (CN)

(72) Inventor: Yeshang Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/276,627

(22) Filed: May 13, 2014

(65) Prior Publication Data

US 2014/0250527 A1    Sep. 4, 2014

Related U.S. Application Data

(63) Continuation of application No. PCT/CN2013/088491, filed on Dec. 4, 2013.

(30) Foreign Application Priority Data

Jan. 30, 2013   (CN) .......................... 2013 1 0035438

(51) Int. Cl.
*G06F 11/00* (2006.01)
*G06F 21/56* (2013.01)

(52) U.S. Cl.
CPC .............. *G06F 21/56* (2013.01); *G06F 21/561* (2013.01)

(58) Field of Classification Search
CPC ............ H04L 63/1416; H04L 63/1425; H04L 63/1433; H04L 63/1441; H04L 63/145; H04L 21/56; H04L 21/561

USPC ................................ 726/22–25; 713/187–188
See application file for complete search history.

(56) References Cited

U.S. PATENT DOCUMENTS 5,832,208 A * 11/1998 Chen et al. ...................... 726/24
(Continued)

FOREIGN PATENT DOCUMENTS

| CN | 101350822 | 1/2009 |
| CN | 102332071 | 1/2012 |

OTHER PUBLICATIONS

International Search Report issued in corresponding PCT application PCT/CN2013/088491; pp. 1-3, issued Mar. 6, 2014.
(Continued)

*Primary Examiner* — Hosuk Song
(74) *Attorney, Agent, or Firm* — Brinks Gilson & Lione

(57) ABSTRACT

A method performed by a computer system determines propagation relationships of Trojan horse files. A current Trojan horse file is stored into a corresponding current level of a propagation relationship tree. A condition of the current Trojan horse file or of the propagation relationship tree is assessed. The following steps are repeated until the condition is satisfied: search Trojan horse files for a parent, child or sibling relative to the current Trojan horse file, identify one of the Trojan horse files as the current Trojan horse file, and store the current Trojan horse file into a corresponding current level of the propagation relationship tree. When the condition is satisfied, the propagation relationship tree is displayed. The storing of the current Trojan horse file may include storing an identifier of the current Trojan horse file, which may include data abstraction output, and/or a downloading address of the current Trojan horse file.

12 Claims, 9 Drawing Sheets

(56) References Cited

U.S. PATENT DOCUMENTS

| | | | |
|---|---|---|---|
| 7,310,817 B2 * | 12/2007 | Hinchliffe et al. | 726/24 |
| 7,814,542 B1 * | 10/2010 | Day | 726/22 |
| 8,006,306 B2 * | 8/2011 | Gopalan et al. | 726/24 |
| 2008/0256233 A1 | 10/2008 | Hall et al. | |

OTHER PUBLICATIONS

Written Opinion of the International Searching Authority issued in corresponding PCT application PCT/CN2013/088491 pp. 1-4, issued Mar. 6, 2014.

* cited by examiner

The first level

METHOD AND DEVICE FOR DETERMINING PROPAGATION RELATIONSHIP OF TROJAN HORSE FILES

RELATED APPLICATIONS

This application is a continuation application of International Application No. PCT/CN2013/088491, filed on Dec. 4, 2013, titled "METHOD AND DEVICE FOR DETERMINING PROPAGATION RELATIONSHIP OF TROJAN HORSE FILES," which claims priority to Chinese patent application No. 201310035438.9, filed Jan. 30, 2013 in the State Intellectual Property Office of Peoples Republic of China, titled "METHOD AND DEVICE FOR DETERMINING PROPAGATION RELATIONSHIP OF TROJAN HORSE FILES," each of which is hereby incorporated by reference in their entireties.

FIELD OF THE DISCLOSURE

The present disclosure relates to the field of computer security technology, and particularly to a method for determining propagation relationships of Trojan horse files by a physical device.

BACKGROUND

With the development of Internet technology, more and more Trojan horse programs are spread in networks. Trojan horse programs, usually called Trojan horses, are a kind of malicious code, which may hide in a computer and may be controlled by an external user to steal information or control authority of the computer. Most Trojan horse programs have malicious intentions and cause harm, for example, by occupying system resources, decreasing the efficiency of the computer, endangering information security of the computer (such as stealing a QQ account, a game account or even a bank account), and utilizing the computer as a tool to attack other devices, and so on.

Typically, a relationship between a Trojan horse file stored in a matrix and a Trojan horse file stored in a child of the Trojan horse, including the downloading addresses of the Trojan horse files may be obtained by manual analysis and running of a virtual machine. Md5s output, which may include an abstract data type, produced by processing of the matrix and the child may be stored in conjunction with the downloading address for the Trojan horse file for later query.

SUMMARY

A method, device and computer system for determining a propagation relationship of Trojan horse files are provided, according to one or more embodiments of the disclosure, in order to improve the probability of finding a propagation source of Trojan horse files.

A method for determining a propagation relationship of Trojan horse files is provided according to one aspect of an embodiment of the disclosure, which may include:
step 101, storing, for example, recording, adding or saving a current Trojan horse file into a corresponding current level of a propagation relationship tree;
step 102, determining whether a condition is met by the current Trojan horse file, proceeding to step 103 when the condition is not met or proceeding to step 104 when the condition is met;
step 103, searching Trojan horse files for a parent Trojan horse file of the current Trojan horse file, identifying one of any found parent Trojan horse files as a current Trojan horse file, updating the current propagation relationship tree level and proceeding with steps 101 to 103; and
step 104, displaying the propagation relationship tree according to a determined processing manner.

The condition may include one or more conditions and may be referred to as a relationship condition. In some embodiments, the condition may be a preset or specified condition and/or may be based on an actual condition of the Trojan horse files or propagation relationship tree. However, the condition is not limited in this regard and may include any suitable condition.

A device and/or computer system operable to determine propagation relationships of Trojan horse files are provided according to another aspect of an embodiment of the disclosure, which may include:
an storing unit, adapted to store a current Trojan horse file into a corresponding current level of a propagation relationship tree in memory;
a determining unit, adapted to determine whether a relationship condition is met by the current Trojan horse file after the current Trojan horse file is stored to the corresponding level of the propagation relationship tree by the storing unit where the relationship condition may be a preset condition;
a searching unit, adapted to, when it is determined by the determining unit that the relationship condition is not met, search for parent Trojan horse files of the current Trojan horse file, identify one of the searched parent Trojan horse files as a current Trojan horse file, update the current level of the propagation relationship tree when needed and trigger the storing unit to store the current Trojan horse file into the corresponding current level of the propagation relationship tree; and
a processing unit, adapted to display the propagation relationship tree in a determined processing manner in instances when it is determined by the determining unit that the relationship condition is met.

In view of the above, the method for determining a propagation relationship of Trojan horse files according to an embodiment of the disclosure may include: step 101, storing a current Trojan horse file into a corresponding current level of a propagation relationship tree; step 102, determining whether a relationship condition is met, proceeding to step 103 in instances when the relationship condition is not met, or proceeding to step 104 in instances when the relationship condition is met where in some embodiments, the relationship condition may be preset; step 103, searching for parent Trojan horse files of a current Trojan horse file, identifying one of the parent Trojan horse files as a current Trojan horse file and proceeding with steps 101 to 103; step 104, processing the propagation relationship tree according to a determined manner. According to the embodiment, a level by level searching mechanism using parent-child relationships of Trojan horse files is introduced to find a propagation source; propagation relationships of the Trojan horse files are recorded using the propagation relationship tree; and searching is performed level by level using a determined relationship condition. Therefore, searching for the propagation source of the Trojan horse files may proceed to the deepest available level and/or within a controllable range. In this manner, the probability of finding the propagation source of the Trojan horse files may be improved and a base may be established for effectively preventing and controlling propagation of the Trojan horse files.

BRIEF DESCRIPTION OF THE DRAWINGS

In order to more clearly explain the technical solutions according to embodiments of disclosure, the drawings, which are used in the description of the embodiments, are described briefly hereinafter. The drawings described herein represent only some embodiments related to the present disclosure. Other drawings may be determined by those skilled in the art based on the drawings described herein without a creative effort.

DETAILED DESCRIPTION

A method, device and computer system for determining propagation relationships among Trojan horse files are provided according to embodiments of the disclosure that may improve the probability of finding a propagation source of the Trojan horse files.

The method, device and computer system may be better understood with reference to the following drawings and description. The drawings and description include non-limiting and non-exhausting embodiments of the present disclosure. All other embodiments made by those skilled in the art on the basis of the embodiments of the present disclosure, without inventive effort fall within the protection scope of the present disclosure.

Various embodiments of the disclosure are explained in the following descriptions with reference to the drawings.

The terms "first", "second", "third", "fourth" and so on, where included in the description, claims and the drawings of the disclosure may be used to distinguish similar objects from each other, and are not necessarily used to describe a certain order. It may be understood that the various embodiments of the present disclosure described herein may be implemented in an order other than an order which is illustrated or described herein. Furthermore, terms "include" and "have" as well as their variations are intended to cover non-exclusive including. For example, a process, method, system, product or device including a series of steps or units may include other steps or units which are not explicitly listed or are inherent to the process, method, product or device.

Figure 1A:
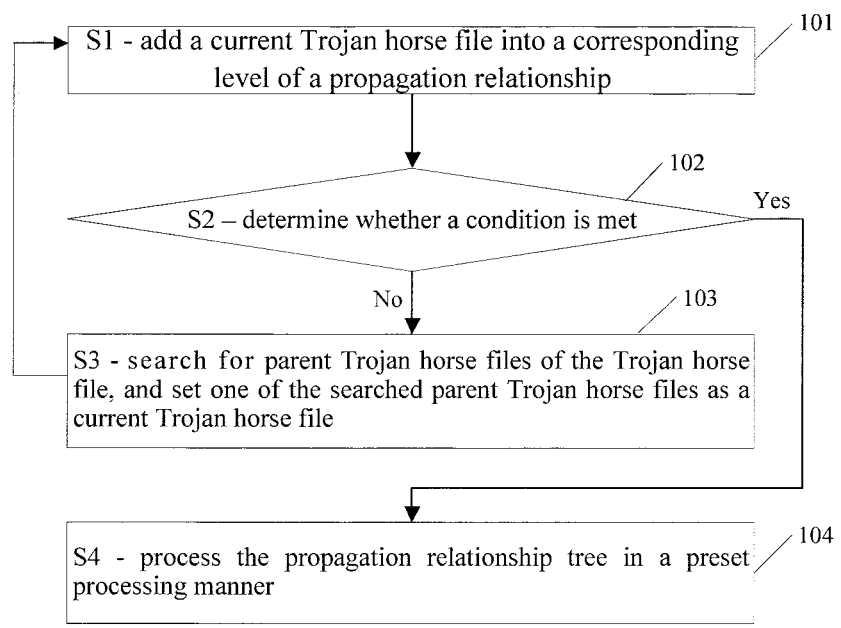
FIG. 1a is a flowchart of a method for determining a propagation relationship of Trojan horse files according to an embodiment of the disclosure.

Now turning to the figures. FIG. 1a is a flowchart representing a method for determining propagation relationships of Trojan horse files according to an embodiment of the disclosure. As shown in FIG. 1a, the method for determining propagation relationships of Trojan horse files according to the embodiment of the disclosure may include the following exemplary steps.

Step 101, may include storing a current Trojan horse file into a corresponding current level of a propagation relationship tree. A propagation relationship tree may be referred to as a P.R. tree or a tree, for example.

According to some embodiments of the disclosure, the storing the current Trojan horse file into a corresponding current level of a propagation relationship tree may include: storing information such as an identifier and/or address information which may be used for downloading the current Trojan horse file from a network, into the corresponding current level of the propagation relationship tree.

According to some embodiments of the disclosure, multiple Trojan horse files may be collected in advance in various ways. The collected files may be searched and parent Trojan horse files and/or a child Trojan horse files, in instances when one or more exits, may be recorded, Information, such as URLs (Uniform/Universal Resources Locator) of the Trojan horse files may be further recorded.

For example, several Trojan horse files may be automatically collected using a computer system, from Trojan horses and external websites on the Internet using web crawlers or other tools. The Trojan horse files and their downloading links may be saved. By using a cloud antivirus system, for example, the Tencent PC Manager, operations performed by a user on the files such as, for example, downloading, decompressing and releasing may be performed at the user side system, and file relationship data and corresponding URL data, that may include large amounts of data, may be acquired and stored on a cloud side system. Where, for example, a compressed file may be decompressed in the computer system by the user and several decompressed files may be obtained. A parent-child relationship may be established between the compressed file and the decompressed files. The compressed file may be regarded as a parent Trojan horse file of the decompressed files, and the decompressed files may be regarded as child Trojan horse files of the compressed file. In instances when the decompression operation result in multiple Trojan horse files, the multiple Trojan horse files may be regarded as sibling Trojan horse files to each other.

Figure 1B:
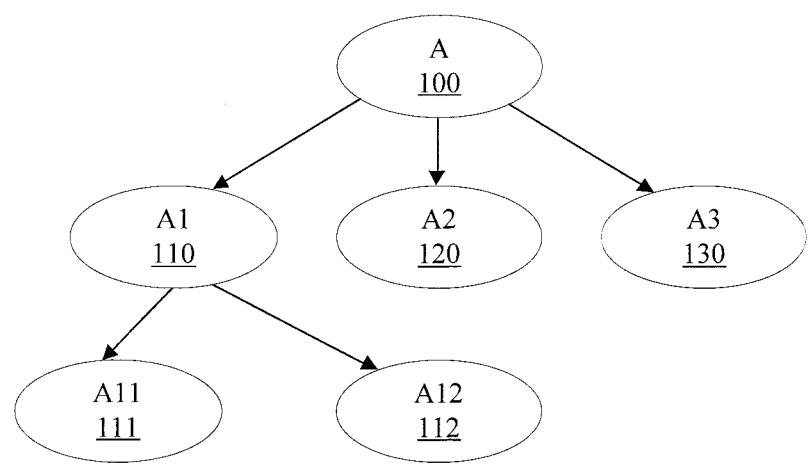
FIG. 1b is a schematic diagram representing propagation relationships of Trojan horse files according to an embodiment of the disclosure.

Referring to FIG. 1b, relationships regarding a parent Trojan horse file, a child Trojan horse file and a sibling Trojan horse file are introduced below in conjunction with FIG. 1b for a better understanding of the steps described with respect to FIG. 1a. As shown in FIG. 1b, a Trojan horse file 100 A may be collected from the network. A Trojan horse file 110 A1, a Trojan horse file 120 A2 and a Trojan horse file 130 A3 may be obtained by decompressing the Trojan horse file 100 A. A Trojan horse file 111 A11 and a Trojan horse file 112 A12 may be obtained by decompressing the Trojan horse file 110 A1. In this case, either of the Trojan horse files 111 A11 or 112 A12 may be considered as a child Trojan horse file of the Trojan horse file 110 A1. Correspondingly, the Trojan horse file 110 A1 may be a parent Trojan horse file of the Trojan horse files 111 A11 and 112 A12. The Trojan horse file 111 A11 may have a same parent Trojan horse file as that of the Trojan horse file 112 A12. Furthermore, the Trojan horse file 111 A11 and the Trojan horse file 112 A12 may be referred to as sibling Trojan horse files relative to each other. Similarly, each of the Trojan horse files 110 A1, 120 A2 and 130 A3 may be referred to as a child Trojan horse file of the Trojan horse file 100 A. The Trojan horse file 100 A may be referred to as a parent Trojan horse file of the Trojan horse files 110 A1, 120 A2 and 130 A3. Moreover, the Trojan horse files 110 A1, 120 A2 and 130 A3 may be referred to as sibling Trojan horse files relative to each other.

It may be understood, that a parent Trojan horse file, a child Trojan horse file and a sibling Trojan horse file may be considered relative concepts to each other. One Trojan horse file may be a parent Trojan horse file of another Trojan horse file, a child Trojan horse file of further another Trojan horse file, and/or a sibling Trojan horse file of still another Trojan horse file. One Trojan horse file may have multiple parent Trojan horse files, multiple child Trojan horse files and/or multiple sibling Trojan horse files. For example, the Trojan horse file 110 A1 is a parent Trojan horse file of the Trojan horse file 111 A11, a child Trojan horse file of the Trojan horse file 100 A, and a sibling Trojan horse file of the Trojan horse files 120 A2 and 130 A3.

It may be understood that in a propagation relationship tree, sibling Trojan horse files may be at a same level, a parent Trojan horse file may be at a level which is one level higher than that of a child Trojan horse file, and a child Trojan horse file may be at a level which is one level lower than that of a parent Trojan horse file.

Referring again to FIG. 1*a*, at step 102, the system may determine whether a relationship condition is met. In instances when it is determined that the relationship condition is not met, the exemplary steps may proceed to step 103. In instances when it is determined that the relationship condition is met, the exemplary steps may proceed to step 104.

According to some embodiments of the disclosure, the relationship condition may be set depending on actual conditions or specified requirements. For example, the relationship condition may include: that a number associated with a level at which the current Trojan horse file is positioned in the propagation relationship tree is greater than a threshold N; that a number associated with the highest level in the propagation relationship tree is greater than the threshold N; or that the current Trojan horse file has no parent Trojan horse file. For example, the threshold N may be assigned as a value such as 10, 15, 20, 25, 30 or any other suitable value greater than 1. In this regard, a relationship condition may depend on a threshold value that may be utilized to control the range of levels or depth of a propagation relationship tree. Setting a threshold may refer to assigning a value to the threshold.

At step 103, the system may search for parent Trojan horse files of the current Trojan horse file, from the Trojan horse files that have not yet been stored to the propagation relationship tree, identify one of the Trojan horse files as a current Trojan horse file, update the current level as needed and then return to the step 101.

At step 104, the propagation relationship tree may be processed in a determined processing manner.

According to some embodiments of the disclosure, the processing of the propagation relationship tree in a determined processing manner may include: displaying the propagation relationship tree; and/or, displaying a number associated with a level at which the current Trojan horse file is positioned in the propagation relationship tree; and/or, displaying an identifier of and/or a downloading address for the current Trojan horse file. Notwithstanding, the propagation relationship tree may be processed in other manners of processing.

According to some embodiments of the disclosure, the identifier of the current Trojan horse file may include abstract data, for example, MD5 output or other types of data abstraction output, a name of the current Trojan horse file and/or any other suitable information that may be used to identify the current Trojan horse file.

The method for determining propagation relationships of Trojan horse files according to the embodiment may include: step 101, storing a current Trojan horse file into a corresponding current level of a propagation relationship tree; step 102, determining whether a relationship condition is met, proceeding to step 103 when the relationship condition is not met, or proceeding to step 104 when the relationship condition is met; at step 103, searching for parent Trojan horse files of the current Trojan horse file, setting one of the parent Trojan horse files as a current Trojan horse file and proceeding with steps 101 to 103; step 104, processing the propagation relationship tree in a determined manner. According to an embodiment, a level by level searching mechanism for a parent-child relationship of Trojan horse files is introduced to find a propagation source; propagation relationships of the Trojan horse files may be recorded using the propagation relationship tree; and searching may be performed for each level using a relationship condition. In this manner, a propagation source of Trojan horse files may be searched for, to as deep of a level as possible and/or within a controllable range. The probability of finding the propagation source of the Trojan horse files may be improved and a base may be established for effectively preventing the propagation of the Trojan horse files. Setting a Trojan horse file as a current Trojan horse file may include identifying and/or treating the Trojan horse file as the current Trojan horse file.

An example of the embodiments is further described below with reference to the drawings.

Figure 2A:
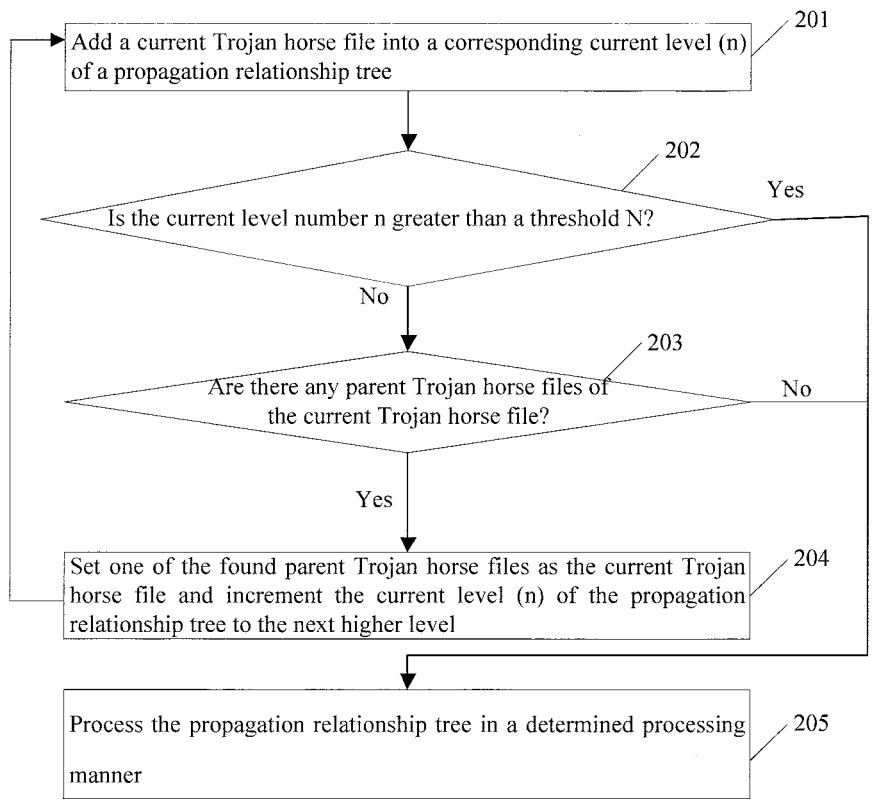
FIG. 2a is a flow chart of a method for determining propagation relationships of Trojan horse files according to an embodiment of the disclosure.

FIG. 2*a* is a schematic flowchart of a method for determining propagation relationships of Trojan horse files according to an embodiment of the disclosure. As shown in FIG. 2*a*, this method for determining propagation relationships of Trojan horse files according to the embodiment of the disclosure may include the following exemplary steps.

Step 201, may include storing a current Trojan horse file into a corresponding current level of a propagation relationship tree.

According to some embodiments of the disclosure, the storing a current Trojan horse file into the corresponding current layer of the propagation relationship tree may include: storing information such as an identifier and/or a downloading address of the current Trojan horse file into the corresponding level of the propagation relationship tree.

According to some embodiments, multiple Trojan horse files may be collected in advance in any suitable way, then a Trojan horse file from the multiple Trojan horse files, which may be a parent Trojan horse file and/or a child Trojan horse file relative to the other Trojan horse files may be recorded or stored as the current Trojan horse file, where information such as URLs of the current Trojan horse file may be further recorded.

Step 202 may include determining whether a current level number (n) associated with the level at which the current Trojan horse file is positioned in the propagation relationship tree, is greater than a threshold N, where in some embodiments, the threshold N may be preset. In instances when the current level number is not greater than the threshold N, the exemplary steps may proceed to step 203. In instances when the current level number is greater than the threshold N, the exemplary steps may proceed to step 205. For example, the threshold N may be 10, 15, 20, 25, 30 or any other suitable value greater than 1.

Step 203 may include searching for a Trojan horse file, from Trojan horse files that have not yet been stored to the propagation relationship tree, which may be a parent Trojan horse file of the current Trojan horse file. In instances when at least one parent of the current Trojan horse file is found by the search, the exemplary steps may proceed to step 204. In instances that no parent of the current Trojan horse is found by the search, the exemplary steps may proceed to step 205.

The step 204 may include identifying one found parent of the current Trojan horse file, which has not been stored into the propagation relationship tree, as the current Trojan horse file, and incrementing the current level number of the propagation relationship tree to correspond to the current Trojan horse file and proceeding to step 201.

Step 205 may include processing the propagation relationship tree in a determined processing manner where in some embodiments the determined processing manner may be preset.

According to some embodiments of the disclosure, processing the propagation relationship tree in a determined processing manner may include: displaying the propagation relationship tree and/or displaying the current level number which corresponds to the level at which the current Trojan horse file is positioned in the propagation relationship tree and/or displaying the current Trojan horse file identifier and/or an address used for downloading the current Trojan horse file. Notwithstanding, the propagation relationship tree may be processed in any other suitable manner.

According to some embodiments of the disclosure, an identifier of the current Trojan horse file may include abstract data such as for example, MD5 output or other types of data abstraction output, and/or a name of the current Trojan horse file. Moreover, other information may be used to identify the current Trojan horse file.

Figure 2B:
FIG. 2b is a schematic diagram representing a propagation relationship tree according to an embodiment of the disclosure.
Figure 2C:
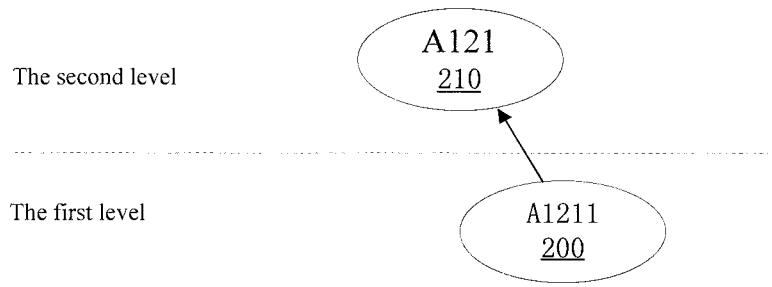
FIG. 2c is a schematic diagram representing a propagation relationship tree according to an embodiment of the disclosure.
Figure 2D:
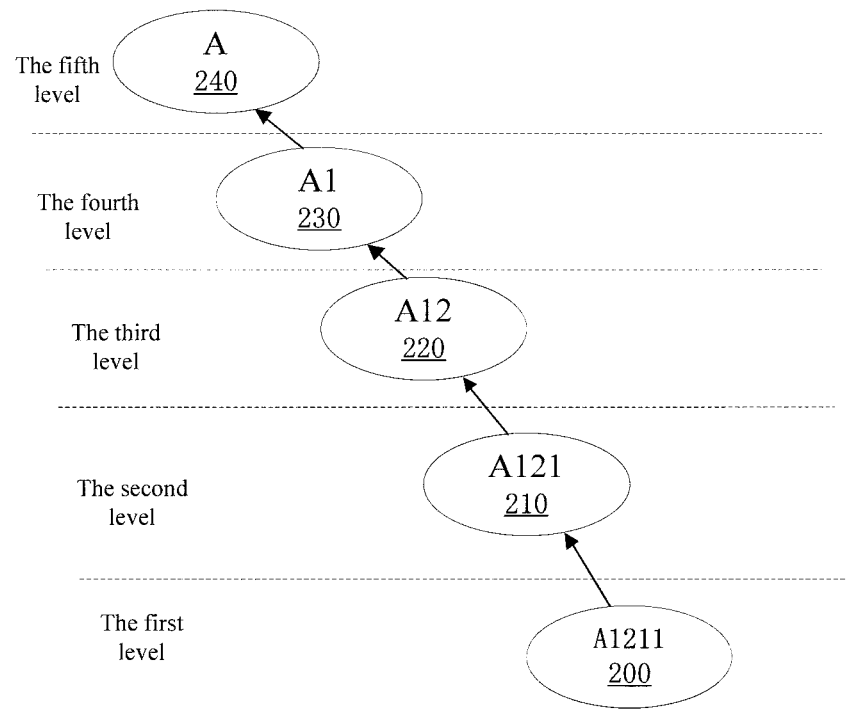
FIG. 2d is a schematic diagram representing a propagation relationship tree according to an embodiment of the disclosure.

In support of the steps described with respect to FIG. 2*a*, a propagation relationship tree which may be created according to the steps, is described with respect to FIGS. 2*b*-2*d*. Prior to creating the propagation relationship tree, a Trojan horse file A 240 may be collected from a network. A Trojan horse file A1 230, a Trojan horse file A2 (not shown) and a Trojan horse file A3 (not shown) may be obtained by decompressing the Trojan horse file A 240. A Trojan horse file A11 (not shown) and a Trojan horse file A12 220 may be obtained by decompressing the Trojan horse file A1 230. A Trojan horse file A121 210, a Trojan horse file A122 (not shown) and a Trojan horse file A123 (not shown) may be obtained by decompressing the Trojan horse file A12 220. A Trojan horse file A1211 200 may be obtained by jointly decompressing the Trojan horse files A121 210 and A122 (not shown).

In this case, both the Trojan horse file A11 (not shown) and the Trojan horse file A12 220 are child Trojan horse files of the Trojan horse file A 240; the Trojan horse file A11 (not shown) has a same parent Trojan horse file as that of the Trojan horse file A12 220; and both the Trojan horse file A11 (not shown) and the Trojan horse file A12 220 are sibling Trojan horse files relative to each other. Similarly, the Trojan horse file A1 230, the Trojan horse file A2 (not shown) and the Trojan horse file A3 (not shown) are child Trojan horse files of the Trojan horse file A 240; the Trojan horse file A 240 is a parent Trojan horse file of the Trojan horse file A1 230, the Trojan horse file A2 (not shown) and the Trojan horse file A3 (not shown). The Trojan horse file A1 230, the Trojan horse file A2 (not shown) and the Trojan horse file A3 (not shown) are sibling Trojan horse files relative to each other. Both the Trojan horse file A121 210 and the Trojan horse file A122 (not shown) are parent Trojan horse files of the Trojan horse file A1211 200. The Trojan horse file A12 220 is a parent Trojan horse file of the Trojan horse file A121 210, the Trojan horse file A122 (not shown) and the Trojan horse file A123 (not shown).

Referring to FIG. 2*b*, initially, the Trojan horse file A1211 200 may be identified as a current Trojan horse file which may be utilized as a reference for searching the other Trojan horse files. FIG. 2*b* represents an initial propagation relationship tree where the Trojan horse file A1211 200 is positioned at the first level of the propagation relationship tree. The threshold N may be set to 20, for example, and the remaining Trojan horse files may be searched for one or more parent Trojan horse files of the current Trojan horse file A1211 200. Found parents of the current Trojan horse file A1211 200 may include the Trojan horse file A121 210 and the Trojan horse file A122 (not shown). One of the found parent Trojan horse files, for example, A121 210 may be identified as the current Trojan horse file. The current level number of the propagation relationship tree may be updated to correspond to the found parent Trojan horse files. The current Trojan horse file A121 210 may be stored into the propagation relationship tree at the current level which may be the second level of the propagation relationship tree as shown in FIG. 2*c*. The computer system may search for parent Trojan horse files of the current Trojan horse file A121 210. The parent Trojan horse files may include the Trojan horse file A12 220 which may be identified as the current Trojan horse file. The current level number may be updated to correspond with the parent Trojan horse file A12 220 and the current Trojan horse file A12 220 may be stored into the propagation relationship tree at the third level. Since the threshold N is set to 20, the Trojan horse files A1 230 and A 240 may be stored to the propagation relationship tree in the same manner according to the steps shown in FIG. 2*a*. The entire propagation relationship tree including the first through fifth levels is shown in FIG. 2*d*.

It will be understood that, the above processes are only exemplary, and may be changed flexibly as required in applications.

The method for determining the propagation relationship of Trojan horse files according to an embodiment of the disclosure may include: storing a current Trojan horse file into a corresponding current level of a propagation relationship tree; determining whether a relationship condition is met; when it is determined that the relationship condition is not met, searching for parent Trojan horse files of the Trojan horse file, setting one of the found parent Trojan horse files as a current Trojan horse file, and repeating the previous steps. When it is determined that the relationship condition is met, the propagation relationship tree may be processed in a determined processing manner. According to the embodiment, a level by level searching mechanism for parent-child relationships of Trojan horse files is introduced to search for a propagation source. The propagation relationship tree may be used to record the propagation relationships of the Trojan horse files, and the level by level searching may be limited by the relationship condition. Therefore, the propagation source of the Trojan horse files may be searched as deep as possible within a controllable range. The probability of finding the propagation source of the Trojan horse files may be improved and a base may be established for effectively preventing the propagation of the Trojan horse files.

FIG. 3 is a flowchart representing a method for determining propagation relationships of Trojan horse files according to an embodiment of the disclosure. Referring to FIG. 3, the method for determining propagation relationships of Trojan horse files according to the embodiment may include the following exemplary steps. Initially, a current Trojan horse file may be identified. For example, the Trojan horse file B1112 300 described below with respect to FIGS. 3b-3e may be identified as the current Trojan horse file. In some embodiments, a corresponding current level of a propagation relationship tree may be identified, for example, as level 1. Moreover, a value N may be assigned, or preset, as a threshold.

Step 301 may include storing the current Trojan horse file into the corresponding current level of a propagation relationship tree.

Step 302 may include determining whether the current level number which may correspond to the current level where the current Trojan horse file is positioned in the propagation relationship tree, is greater than the threshold N.

In instances when the current propagation relationship tree level number is not greater than the threshold N, the exemplary steps may proceed to step 303.

In instances when the current propagation relationship tree level number is greater than the threshold N, the exemplary steps may proceed to step 305.

Step 303 may include searching for parent Trojan horse files of the current Trojan horse file.

In instances when one or more parent Trojan horse files is found, the exemplary steps may proceed to step 304.

In instances when no parent Trojan horse file is found, the exemplary steps may proceed to step 305.

Step 304 may include identifying one of the one or more found parent Trojan horse files that has not been stored into the propagation relationship tree, as the current Trojan horse file, incrementing the current level of the propagation relationship tree to correspond to the current Trojan horse file and proceeding to step 301.

Step 305 may include determining whether the current Trojan horse file has a sibling Trojan horse file that has not been stored into the propagation relationship tree.

In instances when a sibling of the current Trojan horse file, which has not been stored to the propagation relationship tree, has been found, the exemplary steps may proceed to step 308. Step 308 may include setting one sibling Trojan horse file of the current Trojan horse file, which has not been stored into the propagation relationship tree, as a current Trojan horse file, and proceeding to step 301;

In instances when a sibling of the current Trojan horse file, which has not been stored to the propagation relationship tree, has not been found, the exemplary steps may proceed to step 306.

Step 306 may include determining whether a child Trojan horse file of the current Trojan horse file, has a sibling Trojan horse file that has not been stored to the propagation relationship tree.

In instances when the computer system finds at least one sibling of the child of the current Trojan horse file, where the at least one sibling of the child has not been stored to the propagation relationship tree, the exemplary steps may proceed to step 309.

In step 309, one of the at least one found siblings of the child of the current Trojan horse file, where the one of the at least one found siblings has not been stored into the propagation relationship tree, may be set or identified as the current Trojan horse file, and the exemplary steps may proceed to step 301.

In instances when computer system has not found at least one sibling of the child of the current Trojan horse file, where the at least one sibling of the child has not been stored to the propagation relationship tree, the exemplary steps may proceed to step 307.

In step 307, the propagation relationship tree may be processed in a determined processing manner.

According to some embodiments of the disclosure, the processing of the propagation relationship tree in a determined processing manner may include, for example, one or more of: displaying the propagation relationship tree, displaying the current level number of the level at which the current Trojan horse file is positioned in the propagation relationship tree, displaying the identifier of the current Trojan horse file and displaying a downloading address or URL of the current Trojan horse file. Notwithstanding, the propagation relationship tree may be processed in any other suitable manner, for example, to represent the relationships among the Trojan horse files in the propagation relationship tree or provide information about the Trojan horse files in propagation relationship tree.

According to some embodiments of the disclosure, the current Trojan horse file or an identifier of the current Trojan horse file may include abstract data such as, for example, MD5 output or other types of data abstraction output, and/or may include a name of the current Trojan horse file. Moreover, other information may be used to identify the current Trojan horse file.

Figure 3A:
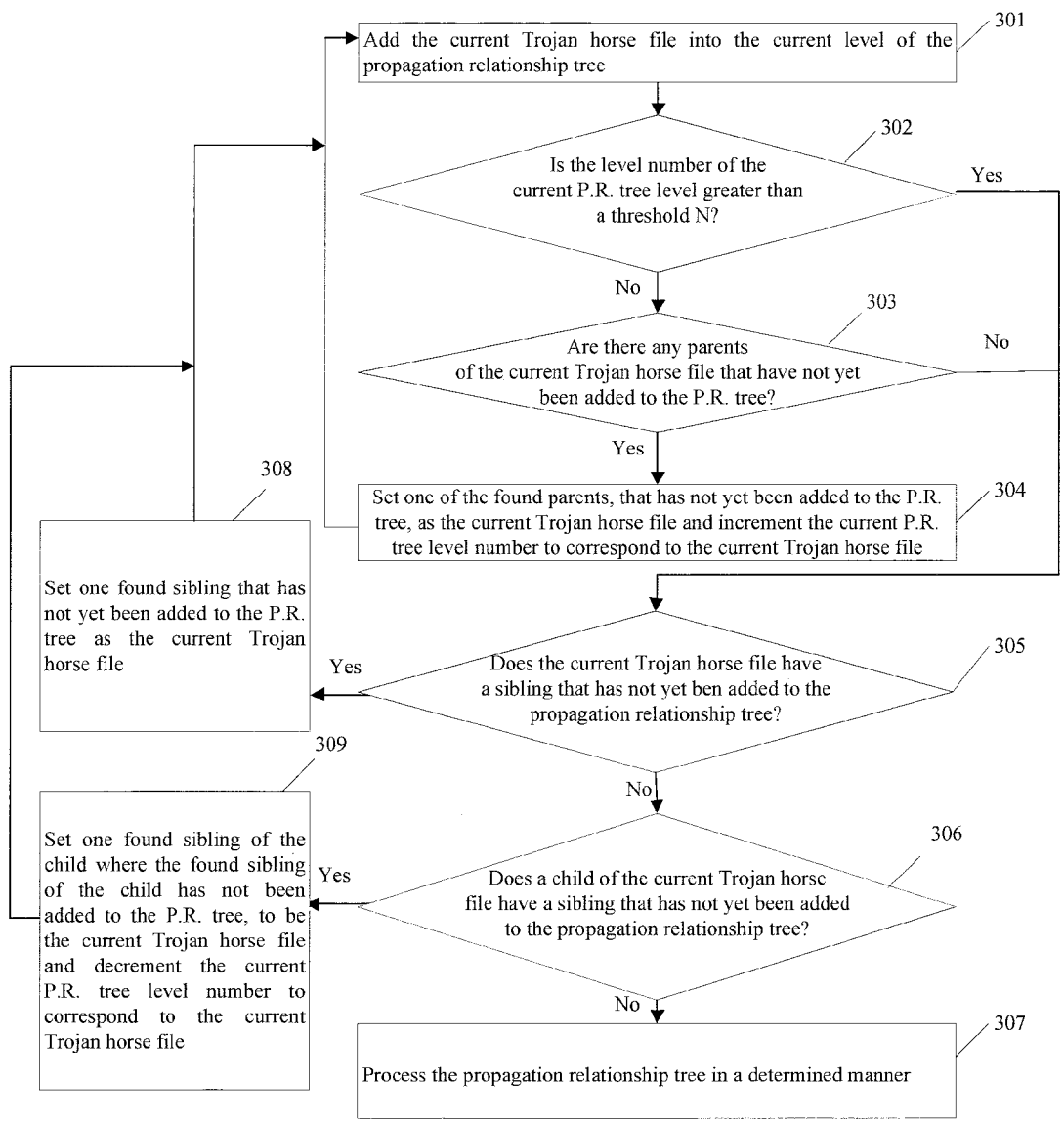
FIG. 3a is a flowchart of a method for determining propagation relationships of Trojan horse files according to an embodiment of the disclosure.

For better understanding of the method described with respect to FIG. 3a, FIGS. 3b-3e represent an example of generating a propagation relationship tree according to the flow chart of FIG. 3a. A Trojan horse file B1 330, a Trojan horse file B2 332, a Trojan horse file B3 334 and a Trojan horse file B12 322 are collected from a network. A Trojan horse file B11 320 may be obtained by jointly decompressing the Trojan horse files B1 330, B2 332 and B3 334. A Trojan horse file B111 310 may be obtained by jointly decompressing the Trojan horse files B11 320 and B12 322. A Trojan horse file B1111 (not shown) and a Trojan horse file B1112 300 may be obtained by decompressing the Trojan horse file B111 310.

Figure 3B:
FIG. 3b is a schematic diagram representing a propagation relationship tree according to an embodiment of the disclosure.
Figure 3C:
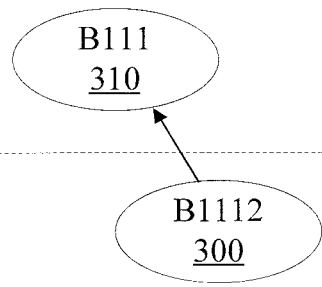
FIG. 3c is a schematic diagram representing a propagation relationship tree according to an embodiment of the disclosure.
Figure 3D:
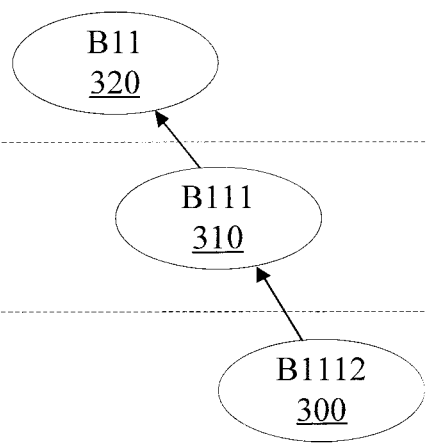
FIG. 3d is a schematic diagram representing a propagation relationship tree according to an embodiment of the disclosure.
Figure 3E:
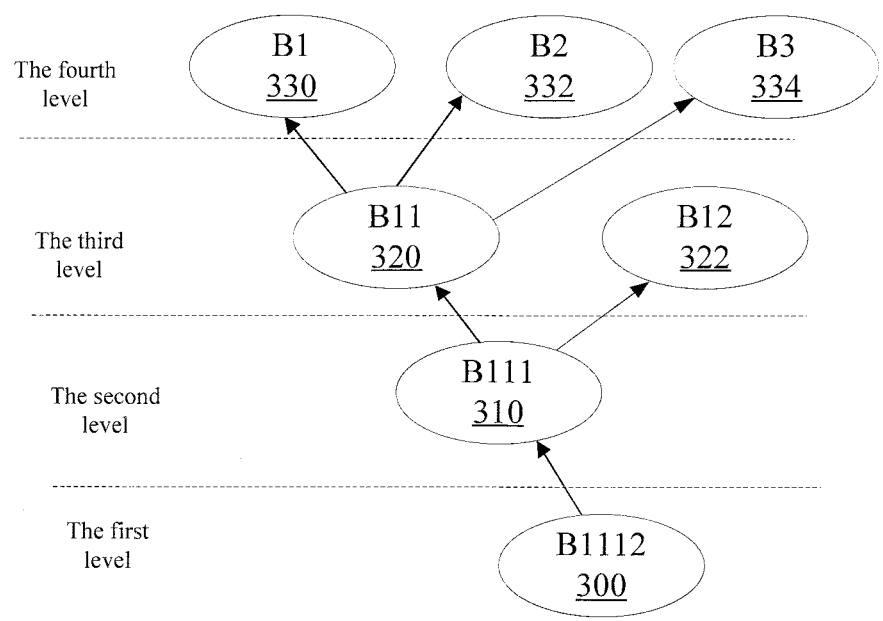
FIG. 3e is a schematic diagram representing a propagation relationship tree according to an embodiment of the disclosure.

Initially, the Trojan horse file B1112 300 may be set or identified as a current Trojan horse file and may be used as a reference to perform searches. The initial propagation relationship tree is shown in FIG. 3b, where the Trojan horse file B1112 300 is positioned at the first tree level (one) of the propagation relationship tree which may be referred to as the current tree level number. A threshold N may be set to three, for example. The computer system may search for parent Trojan horse files of the current Trojan horse file B1112 300. The Trojan horse file B111 310 may be found to be a parent of the Trojan horse file B1112 300 and may be identified or set as the current Trojan horse file. The current tree level number may be incremented to two, to correspond to the found parent B111 310 and the current Trojan horse file B111 310 may be stored into the propagation relationship tree at the current second level of the tree. At this point, a representation of the propagation relationship tree is shown in FIG. 3c. Since the current level number is not greater than the threshold three, the computer system may search for a parent Trojan horse file of the current Trojan horse file B111 310. The Trojan horse files B11 320 and B12 322 may be found to be parents of the current Trojan horse file B111 310. The Trojan horse file B11 320, for example, may be identified as the current Trojan horse file and the current tree level number may be incremented to three to correspond to the current Trojan horse file B11 320. The current Trojan horse file B11 320 may be stored into the propagation relationship tree at the current third level as shown in FIG. 3d. Since the tree level number three is not greater than the threshold three, the computer system may search for a parent of the current Trojan horse file B11 320 and the Trojan horse file B1 330 may become the current Trojan horse file stored to the forth level of the propagation relationship tree and the current tree level may be set to four. Since the current level number, four, is greater than the threshold three, each of the siblings of the Trojan horse file B1 330, including B2 332 and B3 334 will be stored to the propagation relationship tree at the fourth level in accordance with the steps 305 and 308 of the flow chart described with respect to FIG. 3b. When no further sibling is found for the fourth level of the tree, the computer system may search for a sibling of a child of a current fourth level Trojan horse file, as described including the exemplary steps 306 and 309 where the current level of the propagation relationship tree may be decremented to three to correspond to the found sibling of a child Trojan horse files B12 322. In this manner, the propagation relationship tree shown in FIG. 3e may be created.

A method is provided for determining propagation relationships of Trojan horse files by generating a propagation relationship tree according to an embodiment of the disclosure. The method may include storing a current Trojan horse file into a corresponding level of a propagation relationship tree and determining whether a condition, for example, a relationship condition, which may be specified or preset, is satisfied, where the relationship condition may affect which method steps are performed. For example, in some embodiments, a relationship condition may include comparing the propagation relationship tree level of the current Trojan horse file to a threshold. The threshold may affect how many generations of Trojan horse are represented in the propagation relationship tree and/or how many Trojan horse files of the same generation are represented in the Trojan horse tree. When it is determined that the relationship condition is not met, the computer system may search for parent Trojan horse files of the current Trojan horse file, identify one of the found parent Trojan horse files as the current Trojan horse file, and repeat the previous steps. When it is determined that the relationship condition is met, the relationship tree may be processed in a determined processing manner. According to an embodiment, a level by level searching mechanism for parent-child relationships of Trojan horse files is provided to enable searching for a propagation source. The propagation relationship tree may be used to record propagation relationships of the Trojan horse files, and the level by level searching may be limited by the relationship condition. In some embodiments, the propagation source of the Trojan horse files may be searched as deep as possible within a controllable range. In this manner, the probability of finding the propagation source of the Trojan horse files may be improved and a base may be established for effectively preventing propagation of the Trojan horse files.

Figure 4A:
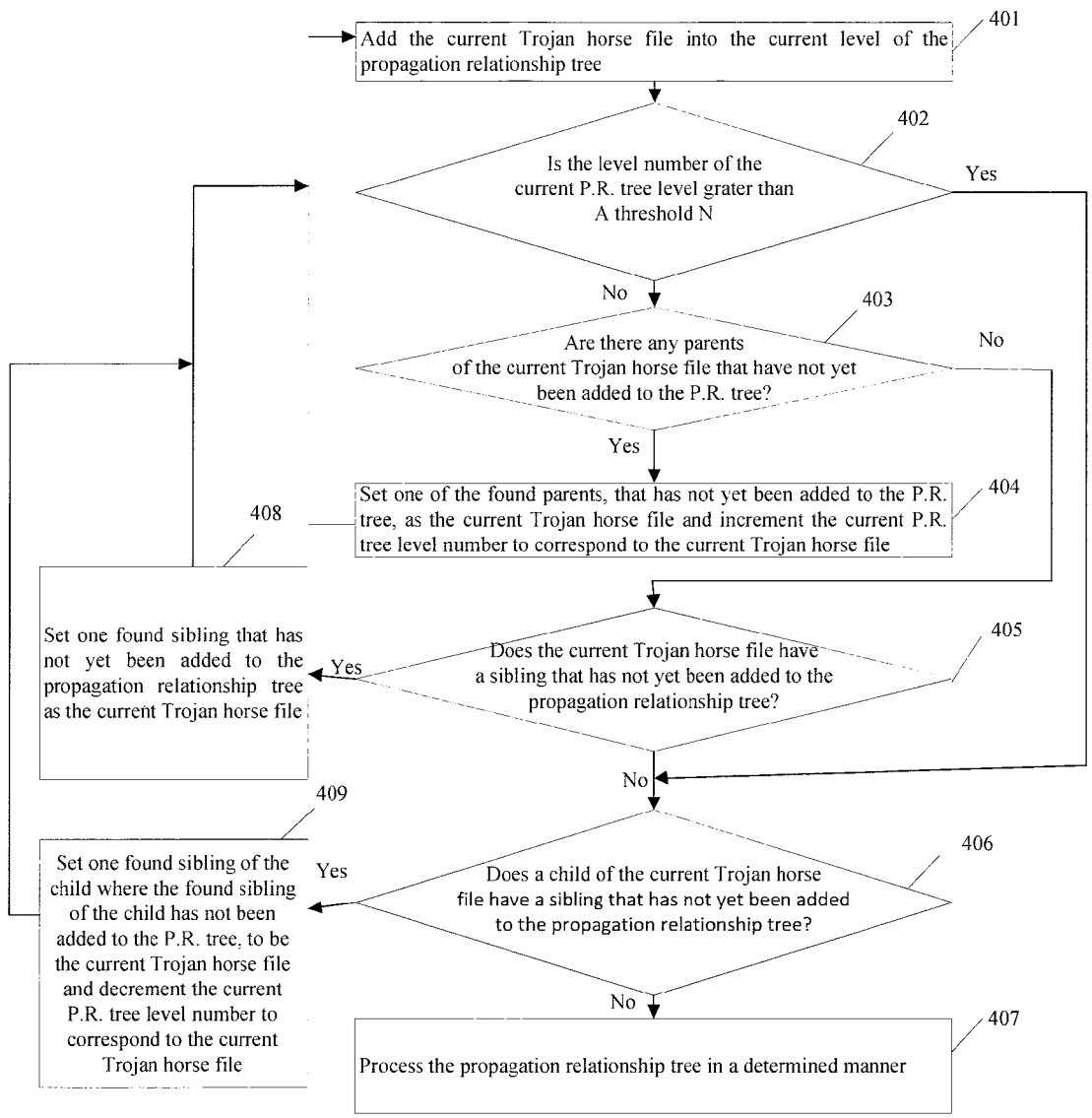
FIG. 4a is a flowchart of a method for determining propagation relationships of Trojan horse files according to an embodiment of the disclosure.
Figure 4B:
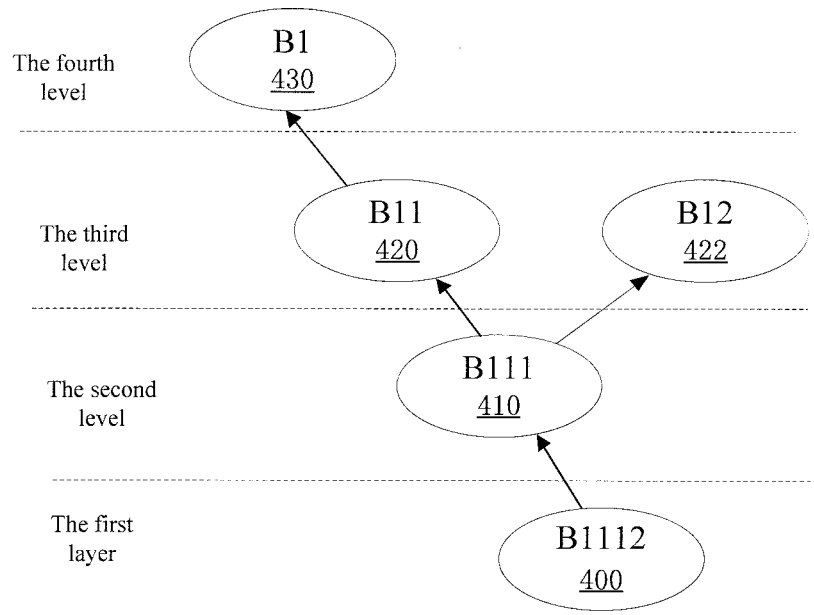
FIG. 4b is a schematic diagram representing a propagation relationship tree according to an embodiment of the disclosure.

FIG. 4 is a flowchart that represents a method for determining propagation relationships of Trojan horse files according to an embodiment of the disclosure. Referring to FIG. 4, the method for determining propagation relationships of Trojan horse files may include the following exemplary steps. Initially, a current Trojan horse file may be identified. For example, the Trojan horse file B1112 400 described below with respect to FIG. 4b may be identified as the current Trojan horse file. In some embodiments, a corresponding current level of a propagation relationship tree may be identified, for example, as level 1. Moreover, a value N may be assigned, or preset, as a threshold.

Step 401, may include storing a current Trojan horse file into a corresponding current level of a propagation relationship tree.

Step 402, may include determining whether the current tree level number is greater than the threshold N, where the current tree level number corresponds to the level in the propagation relationship tree where the current Trojan horse file is positioned. In instances when the current tree level number is not greater than the threshold N, the exemplary steps may proceed to step 403. In instances when the current tree level number is greater than the threshold N, the exemplary steps may proceed to step 406.

Step 403, may include searching for parent Trojan horse files of the current Trojan horse file. In instances when at least one parent Trojan horse file of the current Trojan horse file is found, the exemplary steps may proceed to step 404. In instances when no parent Trojan horse files of the current Trojan horse file are found, the exemplary steps may proceed to step 405.

Step 404, may include setting or identifying one of the found parent Trojan horse files, which has not been stored into the propagation relationship tree, as the current Trojan horse file, and incrementing the current tree level number to correspond to the current Trojan horse file. The exemplary steps may proceed to step 401.

Step 405, may include determining whether the current Trojan horse file which has not been stored into the propagation relationship tree, has a sibling Trojan horse file. In instances a when at least one sibling Trojan horse file of the current Trojan horse file, which has not yet been stored to the propagation relationship tree is found by the search, the exemplary steps may proceed to Step 408. In step 408, one of the found sibling Trojan horse files of the found current Trojan horse file is set or identified as the current Trojan horse file. The exemplary steps may proceed to step 401. In instances a when no siblings of the current Trojan horse file, which have not yet been stored to the propagation relationship tree are found, the exemplary steps may proceed to step 406.

Step 406, may include determining whether a child Trojan horse file of the current Trojan horse file has a sibling Trojan horse file that has not been added to the propagation relationship tree. In instances when at least one sibling of a child of the current Trojan horse file is found where the sibling of the child has not yet been stored to the propagation relationship tree, the exemplary steps may proceed to step 409.

In step 409, one found sibling of the child of the current Trojan horse file, which has not been stored to propagation relationship tree is set or identified as the current Trojan horse file. The exemplary steps may proceed to step 401.

In step 406, in instances when there are no siblings of a child of the current Trojan horse file found, where a sibling of a child of the current Trojan horse file has not yet been stored to the propagation relationship tree, the exemplary steps may proceed to step 407.

Step 407, may include processing the propagation relationship tree in a specified processing manner.

According to some embodiments of the disclosure, the propagation relationship tree may be processed by the computer system in a specified manner by performing one or more of: displaying the propagation relationship tree, displaying the propagation relationship tree level number that corresponds to the level at which the current Trojan horse file is positioned, displaying an identifier and/or a downloading address for the current Trojan horse file. However, the disclosure is not limited in this regard and the propagation relationship tree may be processed in any suitable way.

According to some embodiments of the disclosure the current Trojan horse file or an identifier for the current Trojan horse file may include abstract data, for example, MD5 output or other types of data abstraction output, a name of the current Trojan horse file and/or any other suitable information that may be used to identify the current Trojan horse file.

For better understanding of the method described with respect to FIG. 4a, a propagation relationship tree created according to the flow chart 4a will be described with reference to a propagation relationship tree depicted in FIG. 4b.

Referring to FIG. 4b, a Trojan horse file B1 430, a Trojan horse file B2 (not shown), a Trojan horse file B3 (not shown) and a Trojan horse file B12 422 are collected from a network. A Trojan horse file B11 420 may be obtained by jointly decompressing the Trojan horse files B1 430, B2 (not shown) and B3 (not shown). A Trojan horse file B111 410 may be obtained by jointly decompressing the Trojan horse files B11 420 and B12 422. A Trojan horse file B1111 (not shown) and a Trojan horse file B1112 400 may be obtained by decompressing the Trojan horse file B111 410.

Initially, the Trojan horse file B1112 400 may be set or identified as a current Trojan horse file for performing a searching process. The current Trojan horse file B1112 400 may be stored into a first level of a propagation relationship tree which may look similar to the tree depicted in FIG. 3b. A threshold N may be set to three, for example. A search may be performed to find a parent of the current Trojan horse file B1112 400. For example, the downloaded and decompressed files B1 430, B2 (not shown), B3 (not shown), B11 420, B12 422, B111 410 and B1111 (not shown) may be searched. As a result of the search, the Trojan horse file B111 410 may be found to be a parent of the Trojan horse file B1112 and may be identified as the current Trojan horse file. The current level number of the propagation relationship tree may be incremented to two to correspond to the current Trojan horse file B111 410 and the current Trojan horse file B111 410 may be stored into the propagation relationship tree at the current level that may be the second level. At this point, the propagation relationship tree may look similar to the propagation relationship tree shown in FIG. 3c. Since the current tree level number two is not greater than the threshold three, the computer system may search for parent Trojan horse files of the current Trojan horse file B111 410. Trojan horse files that may be found to be a parent may include the Trojan horse files B11 420 and B12 422. The Trojan horse file B11 420 may be identified as the current Trojan horse file. The propagation relationship tree level number may be incremented to level three to correspond to the current Trojan horse file B11 420 as the parent of B111 410. The current Trojan horse file B11 420 may be stored into the propagation relationship tree at the current tree level two. At this point, the propagation relationship tree may look similar to the tree shown in FIG. 3d.

Since the current tree level number three is not greater than the threshold three, the computer system may search for parent Trojan horse files of the current Trojan horse file B11 420. The Trojan horse files that may be found to be a parent may include the Trojan horse files B1 430, B2 (not shown) and B3 (not shown). The Trojan horse file B1 430 may be identified as the current Trojan horse file. The propagation relationship tree level number may be incremented to level four to correspond to the current Trojan horse file B1 430 as the parent of B11 420. The current Trojan horse file B1 430 may be stored into the propagation relationship tree at the current tree level four. Since the current propagation relationship tree level number four is greater than the threshold value three, the computer system may search the Trojan horse files for a child of the current Trojan horse file B1 430, which has not yet been stored to the propagation relationship tree. The Trojan horse file B12 422 may be found as a child of B1 430, which has not been stored to the tree and may be identified as the current Trojan horse file. The tree level number may be decremented to three to correspond to the current Trojan horse file which is the child of B11 420 and the Trojan horse file B12 422 may be stored to the tree at level three. In this way, the propagation relationship tree shown in FIG. 4b may be obtained. However, the order of steps used to create the propagation relationship tree may be modified.

It will be apparent that, the method for determining the propagation relationship of Trojan horse files according to the embodiment of the disclosure may include: storing a current Trojan horse file into a corresponding level of a propagation relationship tree; determining whether a relationship condition is met; when it is determined that the relationship condition is not met, searching parent Trojan horse files of the current Trojan horse file, setting one of the found parent Trojan horse files as a current Trojan horse file, and repeating the previous steps; when it is determined that the relationship condition is met, searching child Trojan horse files of the current Trojan horse file and processing the propagation relationship tree in a specified processing manner. According to the embodiment, a level by level searching mechanism for parent and/or child relationships of Trojan horse files is introduced to search for a propagation source. The propagation relationship tree may be used to record the propagation relationships of the Trojan horse files, and the level by level searching may be limited by the relationship condition. Therefore, the propagation source of the Trojan horse files may be searched as deep as possible within a controllable range, the probability of finding the propagation source of the Trojan horse files may be improved and a base may be established for effectively preventing propagation of the Trojan horse files.

A related device for implementing the above methods is further described.

Figure 5:
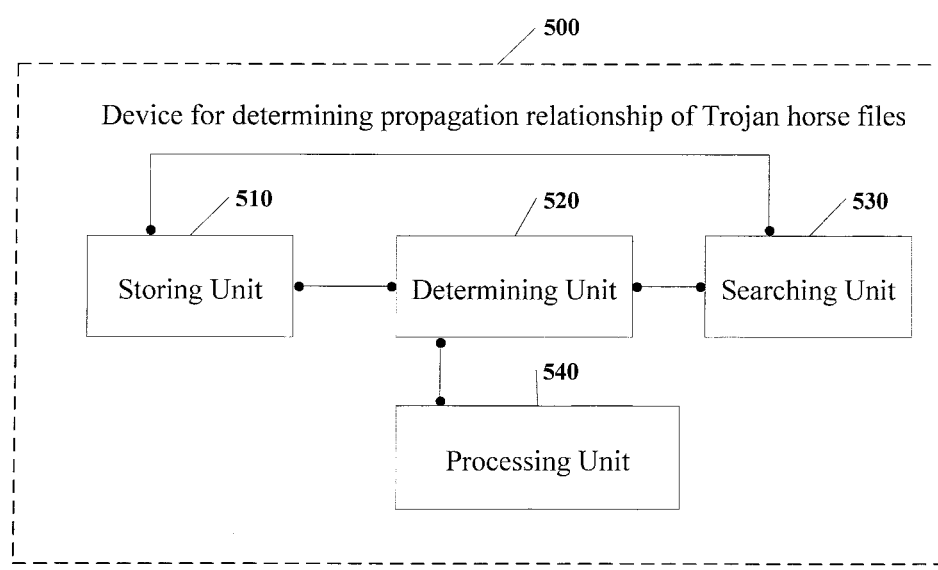
FIG. 5 is a schematic diagram representing a device for determining propagation relationships of Trojan horse files according to an embodiment of the disclosure.

Referring to FIG. 5, a device 500 for determining propagation relationship of Trojan horse files is provided according to an embodiment of the disclosure. The device 500 may include: a storing unit 510, a determining unit 520, a searching unit 530 and a processing unit 540.

The storing unit 510 may be adapted to store a current Trojan horse file into a corresponding current level of a propagation relationship tree.

The determining unit 520 may be adapted to determine whether a relationship condition is met after the current Trojan horse file is stored into the corresponding current level of the propagation relationship tree.

The searching unit 530 may be adapted to, when the determining unit 520 determines that the relationship condition is not met, search for parent Trojan horse files of the current Trojan horse file, set one of found parent Trojan horse files as the current Trojan horse file, and trigger the storing unit 510 to store the current Trojan horse file into a level corresponding to the current Trojan horse file, of the propagation relationship tree.

The processing unit 540 may be adapted to process the propagation relationship tree in any suitable processing manner when the determining unit 520 determines that the relationship condition is met.

According to some embodiments of the disclosure, the storing unit 510 may be further adapted to store the information such as an identifier and/or downloading address of the current Trojan horse file into the current corresponding level of the propagation relationship tree.

According to some embodiments of the disclosure, multiple Trojan horse files may be collected in advance by any suitable method. A parent Trojan horse file and/or a child Trojan horse file, in instances when one is found from the Trojan horse files, may be recorded, and information such as URLs for the Trojan horse files may be further recorded.

For example, several Trojan horse files may be automatically collected from Trojan horses and external websites on the Internet through web crawlers, and the Trojan horse files and other downloading links may be saved. By using a cloud antivirus system of for example, the Tencent PC Manager, operations by a user on the files such as downloading, decompressing, releasing may be performed at the user side, and a large amount of file relationship data and corresponding URL data may be acquired and stored on the cloud side. For example, a compressed file may be decompressed in the computer system by a user and several decompressed files may be obtained, then a parent-child relationship may be established between the compressed file and the decompressed files. The compressed file may be regarded as a parent Trojan horse file of the decompressed files, and the decompressed files may be regarded as child Trojan horse files of the compressed file. In instances when the decompression results in multiple Trojan horse files, the multiple Trojan horse files may be referred to as sibling Trojan horse files relative to each other.

In a propagation relationship tree, sibling Trojan horse files may be positioned at a same level, a parent Trojan horse file may be at a level which is one level higher than a child Trojan horse file, and, the child Trojan horse file may be at a level which is one level lower than the parent Trojan horse file.

According to some embodiments of the disclosure, the relationship condition may be determined depending on actual conditions or specified requirements. For example, the relationship condition may include: whether the number of the level at which the current Trojan horse file is positioned in the propagation relationship tree is greater than a threshold N; whether the number of the highest level in the propagation relationship tree is greater than a threshold N; or whether a Trojan horse file has no parent Trojan horse file. As an example, the threshold N may be 10, 15, 20, 25, 30 or any other suitable value greater than 1.

According to some embodiments of the disclosure, the processing unit 540 may be further adapted to execute one or more of: display a propagation relationship tree, show the number of a level at which a current Trojan horse file is positioned in the propagation relationship tree, display an identifier and/or a downloading address of the current Trojan horse file. Furthermore, a propagation relationship tree may be processed in other suitable manner in practice.

According to some embodiments of the disclosure, the identifier of the current Trojan horse file may, for example, include abstract data such as, for example, MD5 output or other types of data abstraction output, and/or a name of the current Trojan horse file. However, the disclosure is not limited in this regard and any suitable information which can identify the current Trojan horse file may be utilized.

The functions of the units 510, 530 and/or 540 of the device 500, for determining propagation relationships and processing a propagation relationship tree of Trojan horse files according to one or more embodiments of the disclosure may be implemented based on the methods and the details described herein with respect to the figures, however, some of the methods and details are not repeated here.

The device 500 for determining propagation relationships of Trojan horse files according to an embodiment may include: an storing unit 510, adapted to store a current Trojan horse file into a corresponding level of a propagation relationship tree; a determining unit 520, adapted to determine whether a relationship condition is met after the storing unit 510 has stored the current Trojan horse file into the corresponding level of the propagation relationship tree, a searching unit 530, adapted to, when it is determined by the determining unit 520 that the relationship condition is not met, search for parent Trojan horse files of the current Trojan horse file, set one of the found parent Trojan horse files as the current Trojan horse file and trigger the storing unit 510 to store the current Trojan horse file into a corresponding level of the propagation relationship tree, and a processing unit 540, adapted to, when it is determined by the determining unit 520 that the relationship condition is met, process the propagation relationship tree in a processing manner. According to the embodiment, a level by level searching mechanism for parent-child relationships of Trojan horse files is introduced to find a propagation source. The propagation relationship tree may be used to record the propagation relationships of the Trojan horse files, and the level by level searching may be limited by the relationship condition. Therefore, the propagation source of the Trojan horse files may be searched as deep as possible within a controllable range. The probability of finding the propagation source of the Trojan horse files may be improved and a base may be established for effectively preventing the propagation of the Trojan horse files.

Figure 6:
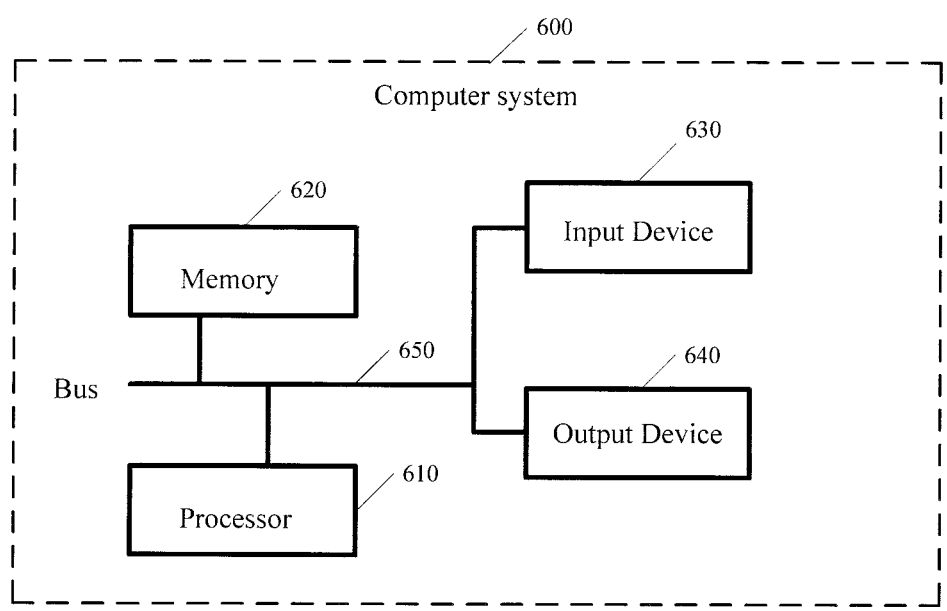
FIG. 6 is a schematic diagram representing a computer system according to an embodiment of the disclosure.

FIG. 6 is a schematic diagram representing a computer system according to embodiments of the disclosure. Referring to FIG. 6, a computer system 600 may include a processor 610, a memory 620, an input device 630, an output device 640 and a bus 650. The processor 610 may include one or more hardware processors. According to some embodiments, the processor 610, the memory 620, the input device 630 and/or the output device 640 may be connected via a bus 640 or by any other suitable communication system that transfers data between components inside a computer, or between computers.

The memory 620 may include instructions that when executed by the processor 610 may cause the processor 610 to perform the methods and functions described herein, for example, the following steps:

step 101, storing a current Trojan horse file into a corresponding level of the propagation relationship tree;

step 102, determining whether a relationship condition is met, proceeding with step 103 when the relationship condition is not met and proceeding with step 104 when the relationship condition is met;

step 103, searching for parent Trojan horse files of the current Trojan horse file, setting or identifying one of the found parent Trojan horse files as the current Trojan horse file, and proceeding with steps 101 to 103;

step 104, processing the propagation relationship tree in a specified processing manner.

According to some embodiments of the disclosure, storing, for example, adding, recording or saving, the current Trojan horse file into a corresponding level of the propagation relationship tree by the processor 610 may include: storing a the information such as an identifier and/or downloading address of the current Trojan horse file into the corresponding level of the propagation relationship tree. In some embodiments the information stored into the propagation relationship tree may include abstract data.

According to some embodiments, the processor 610 may collect multiple Trojan horse files in advance by any suitable method, record a parent Trojan horse file and/or a child Trojan horse file of the Trojan horse files, when on is available, and further record information such as URLs of the Trojan horse files.

For example, the processor 610 may automatically collect several Trojan horse files from Trojan horses and external websites on the Internet through web crawlers, and save the Trojan horse files and their downloading links. The processor 610 may perform the operations by a user on the Trojan horse files such as downloading, decompressing, releasing at the user side, and may acquire a large amount of file relationship data and/or corresponding URL data and store them in the cloud side, for example, by using a cloud antivirus system of the Tencent PC Manager. In this regard, a compressed file may be decompressed in the computer system 600 by a user and several decompressed files may be obtained. A parent-child relationship may be established between the compressed file and the decompressed files. The compressed file may be regarded as a parent Trojan horse file of the decompressed file, and the decompressed files may be regarded as child Trojan horse files of the compressed file. In instances when the decompression results in multiple Trojan horse files, the multiple Trojan horse files may be regarded as sibling Trojan horse files relative to each other.

It may be understood that, in the propagation relationship tree, sibling Trojan horse files are at a same level, a parent Trojan horse file is at a level which is one level higher than a child Trojan horse file, and, the child Trojan horse file is at a level which is one level lower than the parent Trojan horse file.

According to some embodiments of the disclosure, the relationship condition that may determine a next step executed by the processor 610 may be set, for example, identified, assigned or defined, depending on actual conditions or specified requirements. For example, the relationship condition may include: whether a number of a level at which a Trojan horse file is positioned in the propagation relationship tree, is greater than a threshold N; whether the number of the highest level in the propagation relationship tree is greater than the threshold N; or whether the Trojan horse file has no parent Trojan horse file. For example, the threshold N may be one of the values 10, 15, 20, 25, 30 or any other suitable value greater than 1.

According to some embodiments of the disclosure, processing the propagation relationship tree by the processor 610 may include one or more of: displaying the propagation relationship tree, displaying the number of a level at which a current Trojan horse file is positioned at in the propagation relationship tree, and displaying an identifier and/or a downloading address of a current Trojan horse file. However, the disclosure is not limited in this regard and any suitable method may be used to process the propagation relationship tree in practice.

According to some embodiments of the disclosure, the identifier of the current Trojan horse file may, for example, include abstract data abstract, for example, MD5 output or other types of data abstractions and/or a name of the current Trojan horse file. However, the disclosure is not limited in this regards and any suitable type of data or other information may be used to identify the current Trojan horse file.

The functions performed by the devices of the computer system 600, for example, by the hardware processor 630, the memory 620, the input device 630 the output device 640 and the bus 650, for Trojan horse files may be implemented based on the methods and embodiments described herein, the details of which may not be repeated here.

In some systems, steps which may be performed by the processor 610 of the computer system 600 according to the embodiments described herein may include: step 101, storing a current Trojan horse file into a corresponding level of a propagation relationship tree; step 102, determining whether a relationship condition is met, proceeding to step 103 when the relationship condition is not met, or proceeding to step 104 when the relationship condition is met; step 103, searching parent Trojan horse files of the current Trojan horse file, setting one of the found parent Trojan horse files as a current Trojan horse file, and proceeding with steps 101 to 103; and step 104, processing the propagation relationship tree in a suitable processing manner. According to an embodiment, a level by level searching mechanism for a parent-child relationship of Trojan horse files is introduced to search for a propagation source. Propagation relationships of the Trojan horse files may be recorded using the propagation relationship tree. Searching may be performed level by level depending on a relationship condition. Therefore, a propagation source of the Trojan horse files may be searched as deep as possible within a controllable range. The probability of finding the propagation source of the Trojan horse files may be improved and a base may be established for effectively preventing the propagation of the Trojan horse files.

A computer storage medium may be further provided in accordance with several embodiments of the disclosure. The computer storage medium may store a program. When the program is executed, a part or all of the steps of the methods for determining propagation relationships of Trojan horse files, according to the embodiments of methods described herein, are performed.

Trojan horses are very harmful, and the effectively preventing and controlling the Trojan horses is very important. According to the embodiment, a level by level searching mechanism for parent-child relationship of Trojan horse files is introduced to find the propagation source, the propagation relationship tree is used to record the propagation relationship of the Trojan horse files, and the level by level searching is limited by the preset relationship condition. Therefore, the propagation source of the Trojan horse files can be searched as deep as possible within a controllable range, the probability of finding the propagation source of the Trojan horse files can be improved and a base can be established for effectively preventing the propagation of the Trojan horse files.

It is to be noted that, the above embodiments of the method are described as a combination of a series of actions for brevity. However, it is to be known by those skilled in the art, the disclosure is not limited to the order of the described actions, and some steps may be performed in other sequences or may be performed simultaneously. Furthermore, it is also to be known by those skilled in the art, the embodiments in the specification may include preferred embodiments, and the some of the described actions and modules may not be necessary to an embodiment the disclosure.

Each of the above embodiments may have its own focus, however, a portion not described in detail in one embodiment may be referred to in the description of other embodiments.

In summary, the method for determining the propagation relationship of Trojan horse files according to the embodiment of the disclosure may include: step 101, storing a current Trojan horse file into a corresponding level of a propagation relationship tree; step 102, determining whether a relationship condition is met, proceeding with step 103 when the relationship condition is not met, or proceeding with step 104 when the relationship condition is met; step 103, searching parent Trojan horse files of a Trojan horse file, setting one of the parent Trojan horse files as an current Trojan horse file and proceeding with steps 101 to 103; step 104, processing the propagation relationship tree in a determined manner. According to the embodiment, a level by level searching mechanism for parent-child relationship of Trojan horse files is introduced to find the propagation source, the propagation relationship tree is used to record the propagation relationship of the Trojan horse files, and the level by level searching is limited by the relationship condition. Therefore, the propagation source of the Trojan horse files may be searched as deep as possible within a controllable range, the probability of finding the propagation source of the Trojan horse files may be improved and a base may be established for effectively preventing the propagation of the Trojan horse files.

According to several embodiments of the disclosure, it is to be understood, the disclosed device may be implemented in other ways. For example, the embodiments of the device described above are merely exemplary, and the division of the units is merely a division according to logical functions. Other ways of division may be adopted in practice, for example, multiple units or components may be combined or integrated into another system, and some features may be omitted or not performed. At another aspect, the mutual coupling, direct coupling or communication link may be indirect coupling or communication link through some interfaces, devices and units, or may be electrically coupling or other coupling.

Units described as components separated from each other may be or may not be physically separated from each other. Components shown as units may be or may not be physical units, that is, may be located in a same place, or may be distributed over multiple network units. The solutions of the embodiment may be implemented by selecting a part or all of the units as required.

Furthermore, the functional units of the embodiments of the disclosure may be integrated into one processing unit, or may be physically separate units. Also, two or more of the units may be integrated into one processing unit. The integrated unit may be implemented in a form of hardware, or may be implemented in a form of software functional units.

When the integrated unit is implemented in the form of software function units, and is used and sold as a separate product, the integrated unit may be stored in a computer-readable storage medium. In view of this, the essences of the technical solutions of the disclosure, the parts of the technical solutions which contribute to the prior art, or some or all of the technical solutions may be embodied in a form of a software product. The software product may be stored in a storage medium and include several instructions which may enable a computer device, for example, a personal computer (PC), a server, or a network device, to perform all or a part of the steps according to the embodiments of the disclosure when executed. The above-mentioned storage mediums may include various mediums which may store program codes, for example, a U disk, a ROM (read-only memory), a RAM (random access memory), a removable hard disk, a magnetic disk or an optical disk.

The above-described embodiments are merely used to explain and not to limit the solutions and embodiments of the disclosure. Although the disclosure is described in detail in conjunction with the above embodiments, it is to be understood by those skilled in the art, modifications and equivalent alterations to parts or features of the above embodiments may be performed without departing from the spirit and scope of the disclosure.

I claim:

1. A method performed by a computer system for determining propagation relationships of Trojan horse files, the method comprising:
    storing, by a computer comprising a processor, a current Trojan horse file into a corresponding current level of a propagation relationship tree;
    determining, by the computer, whether a relationship condition of the current Trojan horse file or of the propagation relationship tree, is satisfied;
    repeating, by the computer, the following steps until the relationship condition is satisfied:
        searching, by the computer, Trojan horse files for a parent, child or sibling relationship to the current Trojan horse file,
        identifying, by the computer, one of the Trojan horse files as the current Trojan horse file, and
        storing, by the computer, the current Trojan horse file into a corresponding current level of the propagation relationship tree; and
    displaying, by the computer, the propagation relationship tree when the relationship condition is satisfied;
    wherein the relationship condition comprises:
        whether a current level number at which the current Trojan horse file is positioned in the propagation relationship tree is greater than a threshold N;
        whether a level number of a highest level in the propagation relationship tree is greater than the threshold N; or
        whether the current Trojan horse file has no parent, child or sibling Trojan horse file.

2. The method according to claim 1, wherein the displaying, by the computer, the propagation relationship tree includes one or more of:
    displaying the propagation relationship tree;
    displaying a current level number corresponding to the level at which the current Trojan horse file is positioned in the propagation relationship tree;
    displaying an identifier of the current Trojan horse file; and
    displaying a downloading address for the current Trojan horse file.

3. The method according to claim 1, wherein the storing, by the computer, a current Trojan horse file into a corresponding current level of a propagation relationship tree includes storing one or both of:
    an identifier of the current Trojan horse file, and
    a downloading address for the current Trojan horse file,
    into the corresponding level of the propagation relationship tree.

4. The method according to claim 3, wherein the identifier of the current Trojan horse file includes one or both of a data abstraction and a name of the current Trojan horse file.

5. A system including one or more hardware processors for determining propagation relationships of Trojan horse files, the system comprising:
    a storing unit, adapted to store a current Trojan horse file into a corresponding current level of a propagation relationship tree;
    a determining unit, adapted to determine whether a relationship condition of the stored current Trojan horse file or of the propagation relationship tree, is satisfied;
    a searching unit, adapted to, repeat the following steps until it is determined by the determining unit that the relationship condition is satisfied:
        search Trojan horse files for a parent, child or sibling of the current Trojan horse file, identify one of the searched Trojan horse files as the current Trojan horse file, and trigger the storing unit to store the current Trojan horse file into a corresponding current level of the propagation relationship tree; and a processing unit, adapted to display the propagation relationship tree in instances when it is determined by the determining unit that the relationship condition is satisfied;

wherein the relationship condition comprises:

whether a current level number at which the current Trojan horse file is positioned in the propagation relationship tree is greater than a threshold N;

whether a number of a highest level in the propagation relationship tree is greater than the threshold N; or whether the current Trojan horse file has no parent, child or sibling Trojan horse file.

6. The system according to claim 5, wherein the processing unit is further adapted to, when it is determined by the determining unit that the relationship condition is satisfied, perform one or more of:

display the propagation relationship tree;

display a current level number corresponding to the level at which the current Trojan horse file is positioned in the propagation relationship tree;

display an identifier of the current Trojan horse file; and display a downloading address for the current Trojan horse file.

7. The system according to claim 5, wherein the storing unit is further adapted to store one or both of:

an identifier of the current Trojan horse file, and a downloading address of the current Trojan horse file, into the corresponding level of the propagation relationship tree.

8. The system according to claim 7, wherein the identifier of the current Trojan horse file includes one or both of a data abstraction and a name of the current Trojan horse file.

9. A non-transitory computer-readable medium containing codes that can be executed by a computer, when the codes are executed by the computer, the computer performs the following steps for determining propagation relationships of Trojan horse files, the steps comprising:

storing a current Trojan horse file into a corresponding current level of a propagation relationship tree;

determining whether a relationship condition of the current Trojan horse file or of the propagation relationship tree, is satisfied;

repeating the following steps until the relationship condition is satisfied:

searching Trojan horse files for a parent, child or sibling relative to the current Trojan horse file, identifying one of the Trojan horse files as the current Trojan horse file, and storing the current Trojan horse file into a corresponding current level of the propagation relationship tree; and displaying the propagation relationship tree when the relationship condition is satisfied;

wherein the relationship condition comprises:

whether a current level number at which the current Trojan horse file is positioned in the propagation relationship tree is greater than a threshold N;

whether a level number of a highest level in the propagation relationship tree is greater than the threshold N; or whether the current Trojan horse file has no parent, child or sibling Trojan horse file.

10. The non-transitory computer-readable medium according to claim 9, wherein the displaying the propagation relationship tree includes one or more of:

displaying the propagation relationship tree;

displaying a current level number corresponding to the level at which the current Trojan horse file is positioned in the propagation relationship tree;

displaying an identifier of the current Trojan horse file; and displaying a downloading address for the current Trojan horse file.

11. The non-transitory computer-readable medium according to claim 9, wherein the storing a current Trojan horse file into a corresponding current level of a propagation relationship tree includes storing one or both of:

an identifier of the current Trojan horse file, and a downloading address for the current Trojan horse file, into the corresponding level of the propagation relationship tree.

12. The non-transitory computer-readable medium according to claim 11, wherein the identifier of the current Trojan horse file includes one or both of a data abstraction and a name of the current Trojan horse file.

* * * * *